(12) United States Patent
Kurtgis (10) Patent No.: US 6,990,928 B2
(45) Date of Patent: Jan. 31, 2006

(54) METHOD FOR PROVIDING FALL PROTECTION FOR A LOAD IN AN ELEVATED ENVIRONMENT

(76) Inventor: Michael P. Kurtgis, 4101 S.W. 47th Ave., Suite 106, Ft. Lauderdale, FL (US) 33314

(*) Notice: Subject to any disclaimer, the term of this patent is extended or adjusted under 35 U.S.C. 154(b) by 13 days.

(21) Appl. No.: 10/619,096

(22) Filed: Jul. 14, 2003

(65) Prior Publication Data

US 2004/0050343 A1  Mar. 18, 2004

Related U.S. Application Data

(63) Continuation-in-part of application No. 09/864,689, filed on May 24, 2001, now Pat. No. 6,604,712.

(51) Int. Cl.
*A62B 35/00* (2006.01)

(52) U.S. Cl. .............................. 119/770; 182/3; 182/36
(58) Field of Classification Search ................ 119/770, 119/771; 244/137.1, 137.4, 137.2, 137.3; 182/150, 145, 142, 3, 7, 10, 4, 6, 36
See application file for complete search history.

(56) References Cited

U.S. PATENT DOCUMENTS

| | | | |
|---|---|---|---|
| 2,626,447 A | 1/1953 | Hunt | |
| 2,700,781 A | 2/1955 | Smith | |
| 2,966,878 A | 1/1961 | Feiser, Jr. | |
| 3,081,121 A | 3/1963 | Campbell | |
| 3,690,602 A | 9/1972 | Marsh | |
| 4,134,634 A | 1/1979 | Bear | |
| 4,379,534 A | 4/1983 | Miller | |
| 4,478,312 A | 10/1984 | Kurtgis | |
| 4,637,575 A | 1/1987 | Yenzer | |
| 4,673,059 A | 6/1987 | Kurtgis | |
| 5,361,866 A | 11/1994 | Bell | |
| 5,417,304 A | 5/1995 | Kurtgis | |
| 6,374,945 B1 | 4/2002 | Sherwood | |
| 6,604,712 B2 * | 8/2003 | Kurtgis | 244/137.4 |

* cited by examiner

*Primary Examiner*—Teri Pham Luu
*Assistant Examiner*—Elizabeth Shaw
(74) *Attorney, Agent, or Firm*—Mark D. Bowen, Esq.; Stearns Weaver Miller; Weissler Alhadeff & Sitterson, P.A.

(57) ABSTRACT

Improvements in fall protection are disclosed, including a method for providing fall protection for human and non-human loads in elevated environments. The load is equipped with a safety harness and lanyard apparatus having first and second lanyards attached thereto. A method is disclosed for providing fall protection for human and non-human loads in an elevated environment wherein the load is primarily supported by an aerial lift vehicle or structure generally adjacent to a second structure. The method includes the steps of: (1) connecting a safety lanyard apparatus to the load, said safety lanyard apparatus including first and second lanyards, each of said first and second lanyards having one end connected to the load and an opposing connectable free end, said first lanyard incorporating a means for automatic release of said connectable free end thereof in response to a predetermined tensional force; (2) connecting said first lanyard connectable free end to the aerial lift vehicle; (3) connecting said second lanyard connectable free end the structure, whereby the application of a tensional force, greater than or equal to a predetermined force, to said first and second lanyard ends results in activation of said means for automatic release thereby separating said connectable free end of said first lanyard from said safety lanyard apparatus thereby leaving said load suspended from said structure.

11 Claims, 12 Drawing Sheets

METHOD FOR PROVIDING FALL PROTECTION FOR A LOAD IN AN ELEVATED ENVIRONMENT

CROSS REFERENCE TO RELATED APPLICATIONS

This application is a continuation-in-part of U.S. patent application Ser. No. 09/864,689, filed May 24, 2001.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates generally to providing fall protection for loads in an elevated environment, and more particularly, to a method for providing fall protection for human and non-human loads while the load is supported in an elevated environment by an aerial lift and/or while transferring between elevated points on generally adjacent structures.

2. Description of the Background Art

People often work in elevated environments wherein the risk of falling or loss of support is a constant possibility. Construction and maintenance workers often operate from aerial lift systems in elevated environments on or in connection with buildings, towers, bridges, dams, as well a host of other tall man-made and natural structures. In addition, non-human cargo loads are frequently placed in, or transferred to/from elevated points. Accordingly, providing fall protection for human and non-human loads is an important consideration when operating in elevated environments and/or above-ground-level.

There particularly exists a need for providing adequate fall protection for workers operating from aerial lift systems. Aerial lift systems refer to a wide variety of systems designed to place and/or maintain a worker in an elevated environment. As used herein the "aerial lift systems" include movable lifts, scissor lifts, cranes, tree lifts, man lifts, elevator lifts, bucket trucks, airborne lifting vehicles, such as helicopters, temporary structures such as scaffolding, suspension devices, or any other device, apparatus, or system, capable of lifting, elevating, or suspending a human or non-human load in an elevated environment that is subject to a possibility, no matter how remote, of failure. Aerial lifts are often used to support workers while working on and/or transferring to an adjacent structure. Since any aerial lift is subject to failure when operating from or in connection with an aerial lift, it is critically important to provide fall protection for the load, particularly for human loads.

There are a number of basic devices, such as safety harnesses, designed to secure a load in an elevated environment. While the design of known safety devices varies, harnesses for human loads commonly consist of a pair of shoulder straps attached to a waist or chest belt. Some harnesses incorporate suspender style straps with a tether point-of-attachment on the front center of the chest/waist strap. Others comprise a Y-shaped design, where the shoulder straps are connected to a strap extending vertically from the waist belt to form a three-point intersection. Conventional harnesses are typically constructed of nylon webbing, and commonly include padding. Such harnesses are designed to support the human load (i.e., body weight) by the torso and shoulders for suspension.

Sit harnesses comprise another category of fall protection devices commonly used when a person is supported in a suspended configuration. Also known as a pelvic harness, a bosun's seat, a rescue harnesses, or a rigger's harnesses these devices typically suspend the user in a seated posture. The basic design of a sit harness includes a waist belt connected to leg loops routed around the top of the thighs. The point of the tether attachment typically extends directly in front of the upper pelvic region.

Full-body harnesses comprise a combination of sit harnesses and chest harnesses. While there are a number of variations of the basic design of the harness, full-body harnesses commonly include leg loops, shoulder straps, and either a waist belt, a chest belt, or both. The design of the full body harness is such that it assists the user in maintaining an upright, seated posture while suspended.

As note above, human and non-human loads are introduced into elevated environments in a wide variety of applications. For example, bucket trucks, helicopters, and cranes are routinely used to place human and non-human loads in elevated environmental applications.

In addition, rotary winged aircraft, such as helicopters, have been used in a wide variety of load transfer operations, including human external load ("HEL") operations and non-human external load operations. Human external load operations typically involve the transportation of a passenger suspended by a cable assembly under the helicopter. For example, helicopters equipped with load suspension points, or hooks, are capable of transporting loads in sling configuration wherein the load is suspended beneath the helicopter by a suspension apparatus. In other applications, helicopters carry cargo as well as human loads in various configurations external to the fuselage, such as on the skids or on skid-mounted platforms. For example, load-bearing platforms may be affixed to the helicopter to permit persons to operate external to the crew compartment. In other situations, a person may stand on one of the helicopter landing skids and operate in the external environment. HEL operations are commonly performed in transmission line maintenance and repair procedures in the electrical power industry, in the logging industry to access remote work sites, and for emergency rescue operations.

The present inventor has contributed significantly to advances in helicopter external load operations, particularly external human load operations. My U.S. Pat. No. 4,673,059 discloses a method and system for placing a load, which may consist of a combination of personnel and equipment, on or in proximity to components of an energized power transmission line. My U.S. Pat. No. 5,417,304 discloses a method for suspending a load from a rotary winged aircraft, such as a helicopter, using an apparatus that incorporates an emergency release activated by the suspended person. The methods disclosed in the '059 and '304 patents concern operations involving loads suspended beneath a helicopter, and do not particularly address issues relating to fall protection for the external load.

In certain situations, it is necessary or desirable to transfer external loads from a hovering helicopter, bucket truck, crane, or other elevated configuration to a structure, such as a power transmission tower, or an energized or de-energized power transmission line, ground wire, or other elevated point or structure. With regard to helicopters and other lift vehicles, the methods disclosed in the '059 and '034 patents do not disclose suitable apparatus or methods for accomplishing the transfer of an external load from the vehicle, such as a hovering helicopter, to an elevated structure while maintaining adequate safeguards for both the vehicle as well as the load. While the '304 patent discloses an emergency release, the system disclosed therein is a release-on-command type system that requires the suspended person to: (1) realize the existence of an emergency with the helicopter; and (2) manually activate the quick release to permit the helicopter to pull away. As should be apparent, the primary concerns in such human transfer applications involve maintaining adequate fall protection for the person during the transfer procedure without limiting helicopter operations, particularly the availability of emergency maneuvers and operations. It is critical to maintain full fall protection for the person through the entire transfer process, while, at the same not limiting the operation of the helicopter in emergency situations.

Currently, there is little standardization and a general lack of safety procedures practiced by those performing HEL operations. While regulations exist regarding the physical and structural characteristics of external load operations, little consideration has been given to the issue of humans as external loads. Federal Aviation Regulations applicable to rotorcraft operations, particularly those referring to human external loads, are found in Title 14 of the Code of Federal Regulations (CFR). The collection of FAA regulations found in 14 CFR is often referred to as the Federal Aviation Regulations (FARs). Within 14 CFR, part 133 pertains directly to rotorcraft external load operations and contains subparts that address applicability, certification rules, operating rules, and related requirements. In addition, part 27 requires that any external load attaching means must include a quick-release system to enable the pilot to release the external load quickly during flight. While the regulations address a number of areas, they provide no specific detail regarding the attachment method, human load transfer methods, or the structure or function of quick-release devices.

One common, yet inherently risky prior art method of transferring an external human load from a hovering helicopter to a structure, in a non-sling configuration, consists of bringing the helicopter to a hover immediately adjacent to a structure, wherein the helicopter may be stabilized by the placement of one or both skids (or wheels) on the structure, thereby allowing the person to step from the helicopter to the structure. This method, however, is significantly flawed in that, to avoid tethering the helicopter to the structure and thereby limiting the availability of emergency flight procedures (e.g. emergency pull-away), there exist periods of time during the transfer that the person is without fall protection, and consequently at substantial risk.

As a result of the lack of adequate safety methods there have been a number of rotorcraft accidents in connection with HEL operations. During the period from 1973 through 1995, it has been reported that there were 473 external load operations in which the helicopters were involved in either an accident or an incident. Of the 473 accidents listed, a substantial number involved operations using a sling line or sling load. Accordingly, it is recognized that the predominant cause of external load accidents involves problems with the sling line/load.

Thus, although HEL operations have been practiced, there remains a need for safer methods for transferring external loads from hovering helicopters. More particularly there exists a need for an improved method of safely transferring a load from a hovering helicopter to a structure, such as a power transmission tower or line or any other elevated structure, while simultaneously providing total fall protection for the human and preserving emergency operating procedures for the helicopter and crew by incorporating an emergency quick release. Since loads are also transferred using other vehicles, such as aerial lift vehicles including bucket trucks and cranes, there exists a substantially similar need for an improved method for providing fall protection for human and non-human loads in elevated environments and during transfer in elevated environments.

BRIEF SUMMARY OF THE INVENTION

The present invention addresses the shortcomings of the background art by providing a method for providing fall protection for human and non-human loads in elevated environments, and more particularly for providing fall protection for loads while transfer to and/or from supporting structures in elevated environments, and/or while working on a structure from an aerial lift vehicle. The method disclosed herein is suitable for use with a wide variety of aerial lift vehicles including helicopters, bucket trucks, and cranes, as well as permanent and semi-permanent aerial lift structures such as scaffolding, ladders, pulley rigs, and suspension rigs, as well as any other lift system. The method is suitable for use by workers during procedures while supported by a movable aerial lift vehicle, such as a buck truck, helicopter, or crane, while working on an adjacent structure, such as a building or tower, for providing fall protection for the worker even in circumstances wherein the worker is not required to transfer to the structure.

According to a preferred embodiment for use in Helicopter External Load ("HEL") Operations, a helicopter is adapted with an external platform configured for carrying a load external to the aircraft fuselage which load is restrained by an FAA approved safety restraint (e.g. seat belt). The load is equipped with a safety harness and a lanyard apparatus having first and second lanyards connected to the harness. The method is primarily directed to transfer of the load from the hovering aircraft to an adjacent structure.

The method herein is summarized in connection with HEL operations, however, the method is equally suitable for use in a wide variety of elevated applications, vehicles, and structures. According to the method, a helicopter hovers next to a structure, and safe transfer is accomplished by: (1) connecting a safety lanyard apparatus, having first and second lanyards, to the load; (2) securing the load to the helicopter with a safety restraint (e.g. FAA approved restraint, seatbelt, or lanyard) (3) attaching the free end of the first lanyard to the helicopter; (4) releasing any auxiliary safety restraint; (5) attaching the free end of the second lanyard to the structure; (6) detaching the first lanyard from the helicopter; and (7) transferring the load onto the structure. The method is substantially similar when the vehicle is a bucket truck or crane, or when simply accomplishing a transfer between two elevated points on a single or multiple structures When transferring from the structure to the helicopter the method is essentially reversed, however, the first/releasable lanyard is preferably used for connection to the helicopter and the second lanyard is preferably used for connection to the structure. When transferring loads as described, fall protection is provided since the load is safely tethered to a load bearing structure at all times. In addition, the lanyard apparatus includes a quick release mechanism to simultaneously provide an emergency release that allows the aircraft to instantly pull away without placing the external load at risk.

Fall protection and emergency release capabilities are provided by an emergency release lanyard apparatus. The lanyard apparatus provides total fall protection for the load throughout the transfer process without restricting or otherwise limiting available emergency flight options/maneuvers by incorporating an emergency release that automatically activates on demand. In a preferred embodiment, the emergency release lanyard apparatus includes first and second load bearing lanyards, each terminating in a free end incorporating a hook. The competing concerns of fall protection (for the load) and on-demand emergency release (for the aircraft) are each enabled by providing the first lanyard with a quick release mechanism and the second lanyard with a limited slip mechanism.

Each lanyard is attached to a common point, such as a load bearing steel O-ring, which in turn is attached to a safety harness securing the load. Each lanyard has a connectable free end, such as an end that may incorporate a double-action locking hook attached thereto. The first lanyard incorporates a quick-release mechanism, which, upon activation, results in the separation of the hook and free end portion thereof. The second lanyard incorporates a mechanism for activating the quick-release such as a frangible link or limited slip mechanism, which, upon application of a predetermined force thereon, activates the first lanyard's quick-release mechanism. The use of the emergency release lanyard apparatus according to the methods disclosed herein provides total fall protection during the transfer of a load from a hovering rotorcraft to a structure while providing an on-demand quick-release in emergency situations for elevated platforms, bucket trucks, aerial lifts.

Accordingly, it is a primary object of the instant invention to provide improvements in the field of fall protection.

Another object of the present invention is to provide a method for providing fall protection for human and non-human loads in elevated environments.

A further object of the present invention is to provide a system, including apparatus and methods, for providing comprehensive fall protection for a person or thing operating from an aerial lift.

Still another object of the present invention is to provide a system that provides fall protection for a human external load engaged in an elevated transfers, before, during, and after transfer to or from a structure or vehicle.

Yet another object of the present invention is to provide a system for elevated transfer operations that provides an emergency release while transferring human and non-human loads to or from the structure and/or while working on an adjacent structure from an aerial lift.

Still another object of the present invention is to provide a system for HEL operations that permits for release of a helicopter tethered to a structure while transferring a load to or from the structure, without the requirement for human action.

Another object of the present invention is to provide an apparatus for use with loads attached to both a hovering rotorcraft and a fixed structure, or an aerial lift and fixed structure, while providing total fall protection and incorporating an emergency release that does not require activation by the person being transferred.

In accordance with these and other objects, which will become apparent hereinafter, the instant invention will now be described with particular reference to the accompanying drawings.

DETAILED DESCRIPTION OF THE INVENTION

With reference now to the drawings, there is illustrated a preferred embodiment of an emergency release lanyard apparatus and method for using same to provide fall protection for a load while operating from an aerial lift adjacent to a secondary structure. The method disclosed herein is suitable for use with a wide variety of aerial lift vehicles including helicopters, bucket trucks, and cranes, as well as permanent and semi-permanent aerial lift structures such as scaffolding, ladders, pulley rigs, and suspension rigs, as well as any other lift system. The method is suitable for use by workers during procedures while supported by a movable aerial lift vehicle, such as a buck truck, helicopter, or crane, while working on an adjacent structure, such as a building or tower, for providing fall protection for the worker even in circumstances wherein the worker is not required to transfer to the structure.

Figure 1:
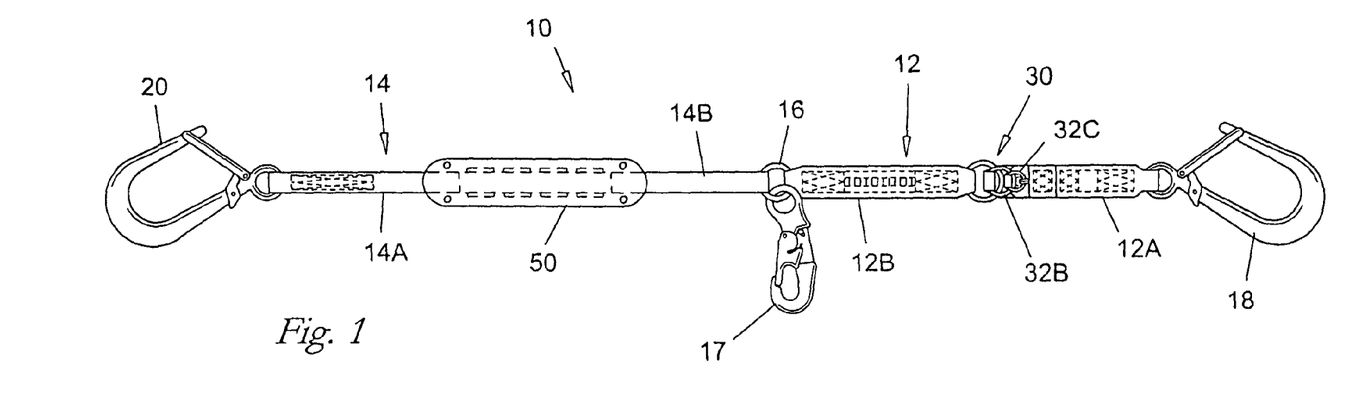
FIG. 1 depicts a top view of an emergency release lanyard apparatus according to the present invention.
Figure 2:
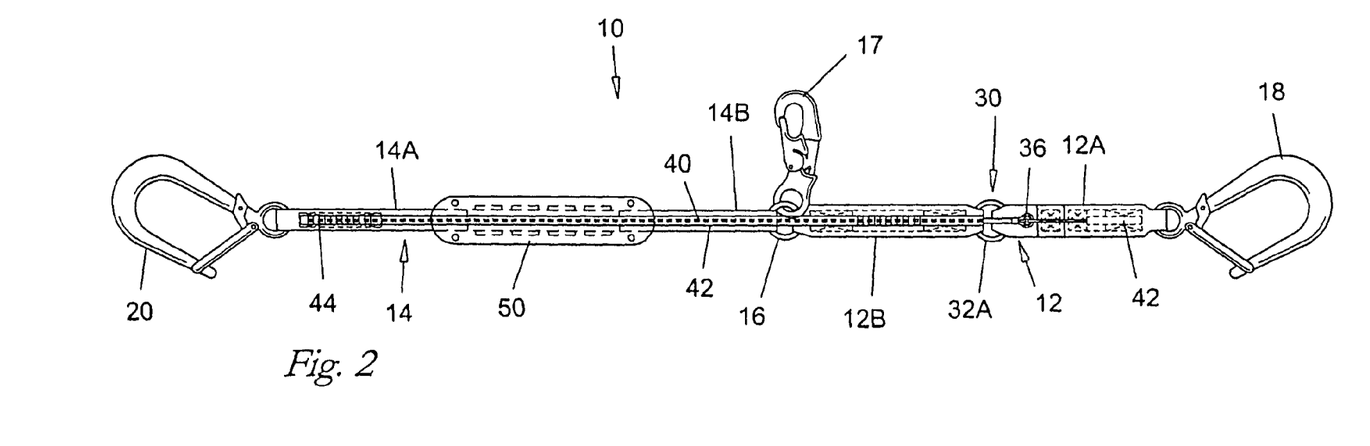
FIG. 2 depicts a bottom view thereof.
Figure 3:
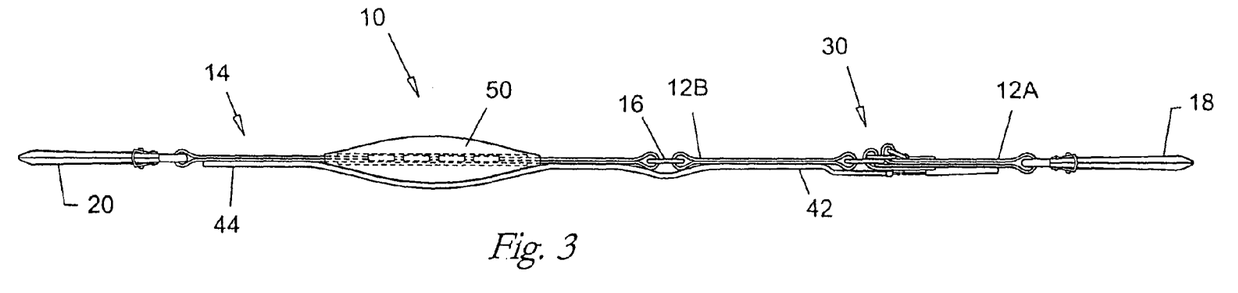
FIG. 3 depicts a side view thereof.
Figure 4:
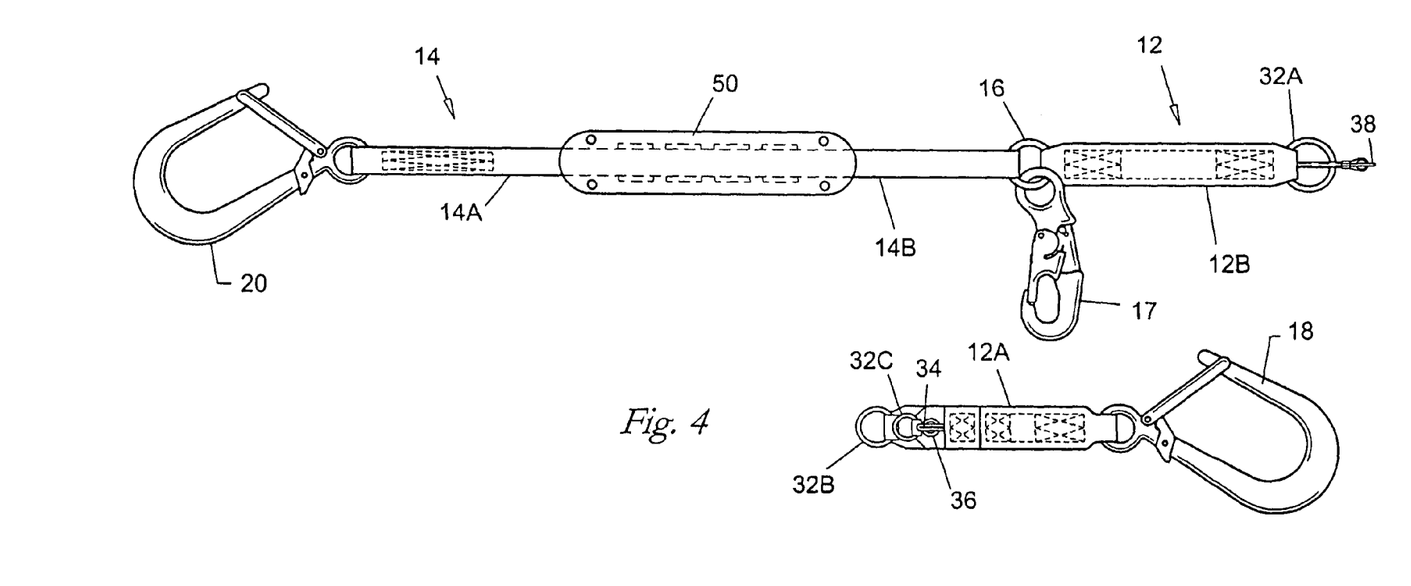
FIG. 4 depicts a top view thereof wherein the lanyard end portion is disconnected from the remaining portion of the apparatus.
Figure 5A:
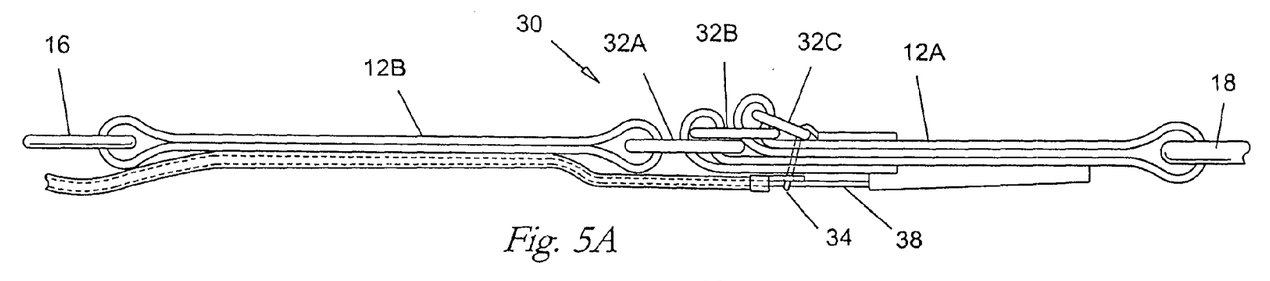
FIG. 5A is side detail view of a preferred embodiment emergency release mechanism for the lanyard apparatus in a connected configuration.
Figure 5B:
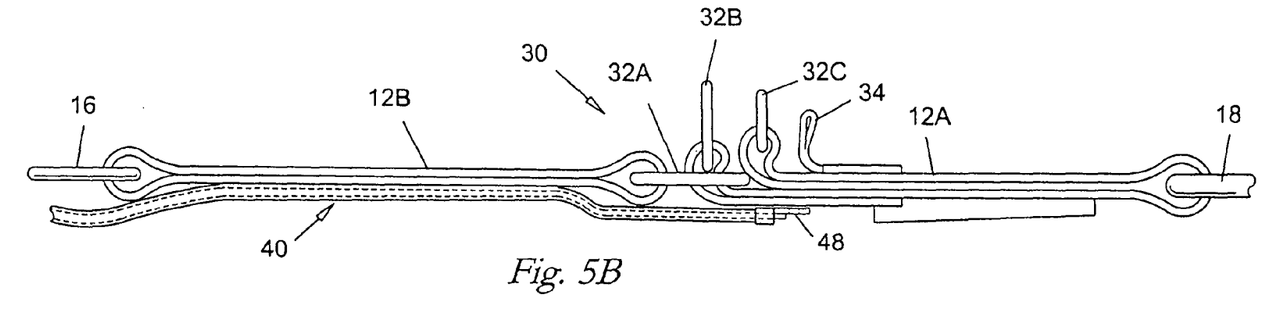
FIG. 5B is another side detail view thereof in a partially released configuration.
Figure 5C:
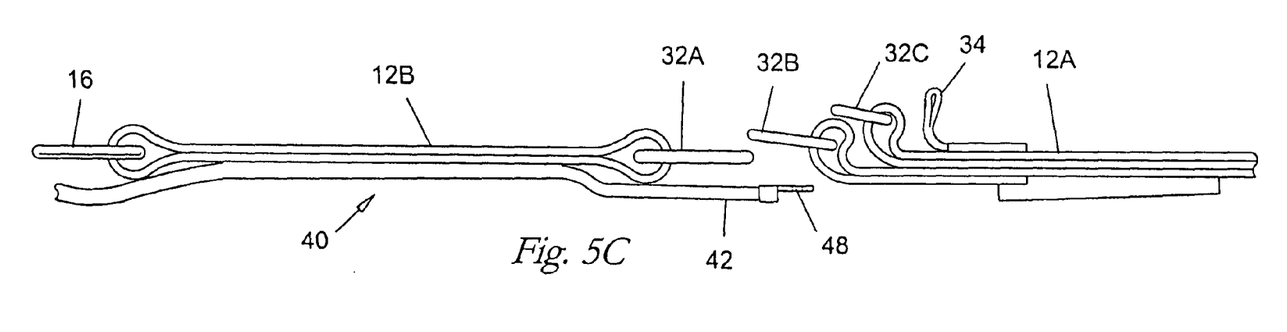
FIG. 5C is another side detail view thereof in a fully released configuration.
Figure 5D:
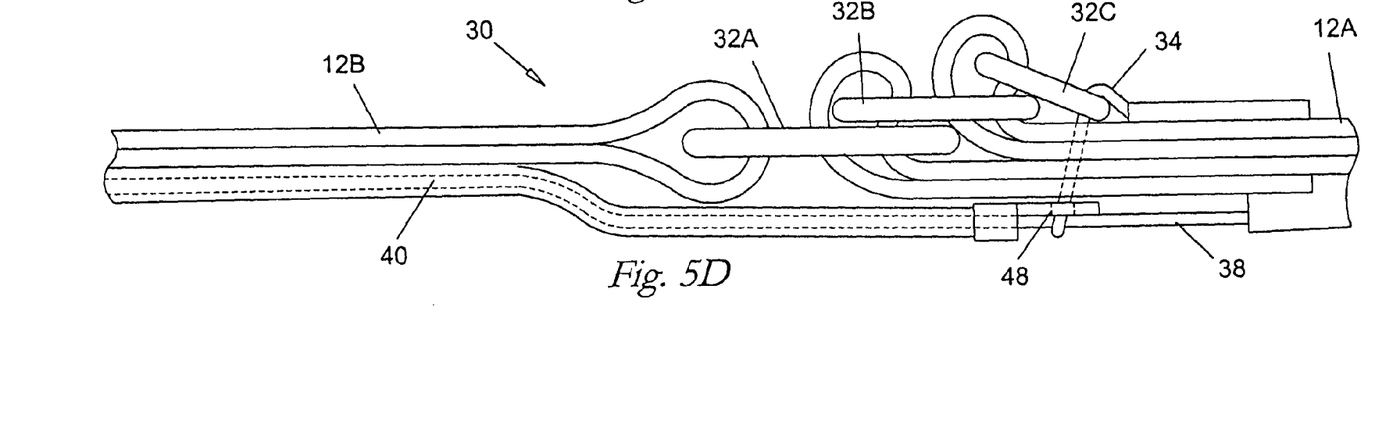
FIG. 5D is partial detail view of the connecting mechanism shown in FIG. 5A.
Figure 6A:
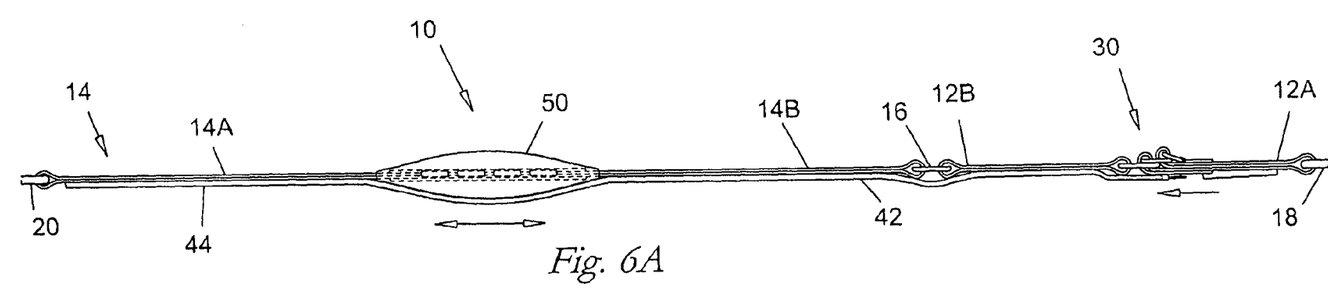
FIG. 6A is a partial side view of the lanyard apparatus illustrating activation of the emergency release mechanism by deployment of the limited slip mechanism.
Figure 6B:
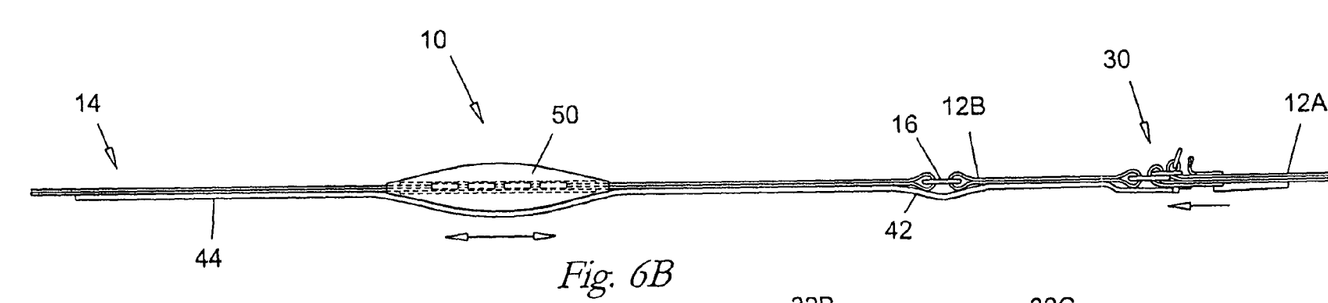
FIG. 6B is a partial side view thereof further illustrating activation of the emergency release mechanism.

FIG. 1 illustrates an emergency release lanyard apparatus, generally referenced as 10, for use with a transfer method disclosed herein. Lanyard apparatus 10 includes a first lanyard 12 and a second lanyard 14, each connected to a load-bearing ring 16. Ring 16 is preferably fabricated from metal and provides a connection point for attaching the lanyard apparatus to the safety harness (not shown) via a safety hook 17 or other equivalent connecting device. The safety harness may be a personal safety harness worn by a human load, or a cargo harness attached to a non-human load. Lanyard segments 12 and 14 may be fabricated from any suitable, flexible load bearing material, such as nylon straps, rope, cable, or equivalent load bearing member. Each lanyard 12 and 14 terminates in a free end fitted with a safety hook, which hooks are referenced as 18 and 20 respectively. Hooks 18 and 20 are preferably locking type hooks, such as ladder hooks or snap hooks, having a double-action locking feature for safety purposes. Specifically, the double-action locking mechanism is a safety feature that requires two separate and distinct manual actions to undo the hook thereby preventing the undesired or unintentional attachment/detachment of the hook. Hooks 18 and 20 are used to selectively attach the lanyard and load to points on a helicopter or structure during the transfer process as more fully disclosed herein. It should be noted, however, that while the preferred embodiment discloses the use of hooks, other suitable attachment devices, such as clamps, may be substituted therefore within the scope of the present invention.

Lanyard 12 incorporates a quick release mechanism, generally referenced as 30, which is adapted for activation by a tensional force applied to lanyard 14. Upon activation of the quick release mechanism the end portion of lanyard 12, generally referenced as segment 12A, is released from the remaining portion of lanyard segment 12, which remaining portion is generally referenced as segment 12B. Quick release mechanism 30 includes a releasable connection joining lanyard segments 12A and 12B. In a preferred embodiment, quick release mechanism 30 includes an interlocked series of rings, referenced as 32A, 32B and 32C, secured in an interlocked load-bearing configuration, joining lanyard segments 12A and 12B, by a loop 34 formed by parachute cord attached to one side of lanyard segment 12A and passing through a metal grommet 36 in lanyard segment 12A. Loop 34 is secured by a pin 38 removably inserted therethrough such that loop 34 secures rings 32A–C in a securely interlocked configuration capable of withstanding substantial loads. Pin 38 is connected to a first end of a cable 40, which is preferably slidably received within a conduit 42 secured to lanyard segment 12B. Conduit 42 terminates in a projecting eyelet 48. Cable 40 includes a second end 44 that is connected to lanyard segment 14, and particularly end segment 14A. Applying a nominal force to the second end 44 of cable 40 causes the cable to retract relative to conduit 42 and loop 34 thereby displacing pin 38 from loop 34 and allowing separation of lanyard segment 12A from segment 12B by disengagement of rings 32A–C.

Lanyard 14 includes an end portion 14A that is connected to the remaining portion of lanyard 14, referenced as 14B, via a limited slip/shock absorbing mechanism, generally referenced as 50. Limited slip mechanism 50 allows for limited extension of lanyard 14 upon application of a predetermined force. In a preferred embodiment, the limited slip mechanism comprises a shock-absorbing lanyard, such as is available from Descent Control, Inc. of Fort Smith, Ark. and/or Miller Fall Protection Products, Inc. of Franklin, Pa., however any suitable limited slip mechanism is considered within the scope of the present invention. Upon application of a sufficient force, such as the force that would be encountered if the rotorcraft attempts to pull away in an emergency situation when tethered to the structure, the limited slip mechanism would activate thereby allowing the length of lanyard 14 to extend. In a preferred embodiment, a force in excess of 500 lbs. is required to activate the limited slip mechanism whereby an additional length of lanyard is deployed. It should be noted, however, that the activation force may be adjusted (upward or downward) depending upon the nature and/or characteristics of the load and the external operation. An activation force of 500 lbs., however, has been found suitable for operations involving human loads, however, a higher (or lower) activation force may be used depending on the load and application. Extension of lanyard 14 causes activation of the quick release mechanism 30 on lanyard 12 as described hereinabove by movement of cable 40 and pin 38 from loop 34 thereby freeing the interlinked ring assembly, e.g. rings 32A–C, and allowing for separation of lanyard segments 12A and 12B.

Figure 7A:
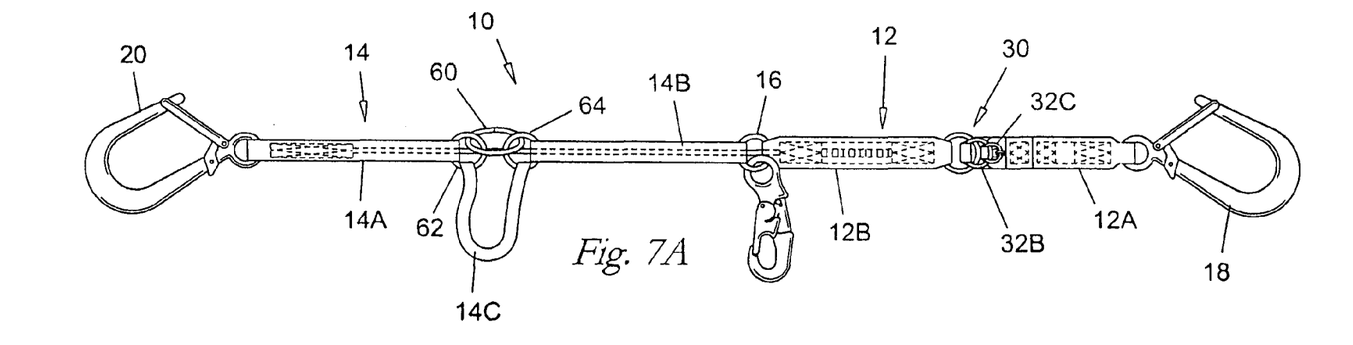
FIG. 7A is an alternate embodiment lanyard apparatus in a connected configuration with a breakaway link.
Figure 7B:
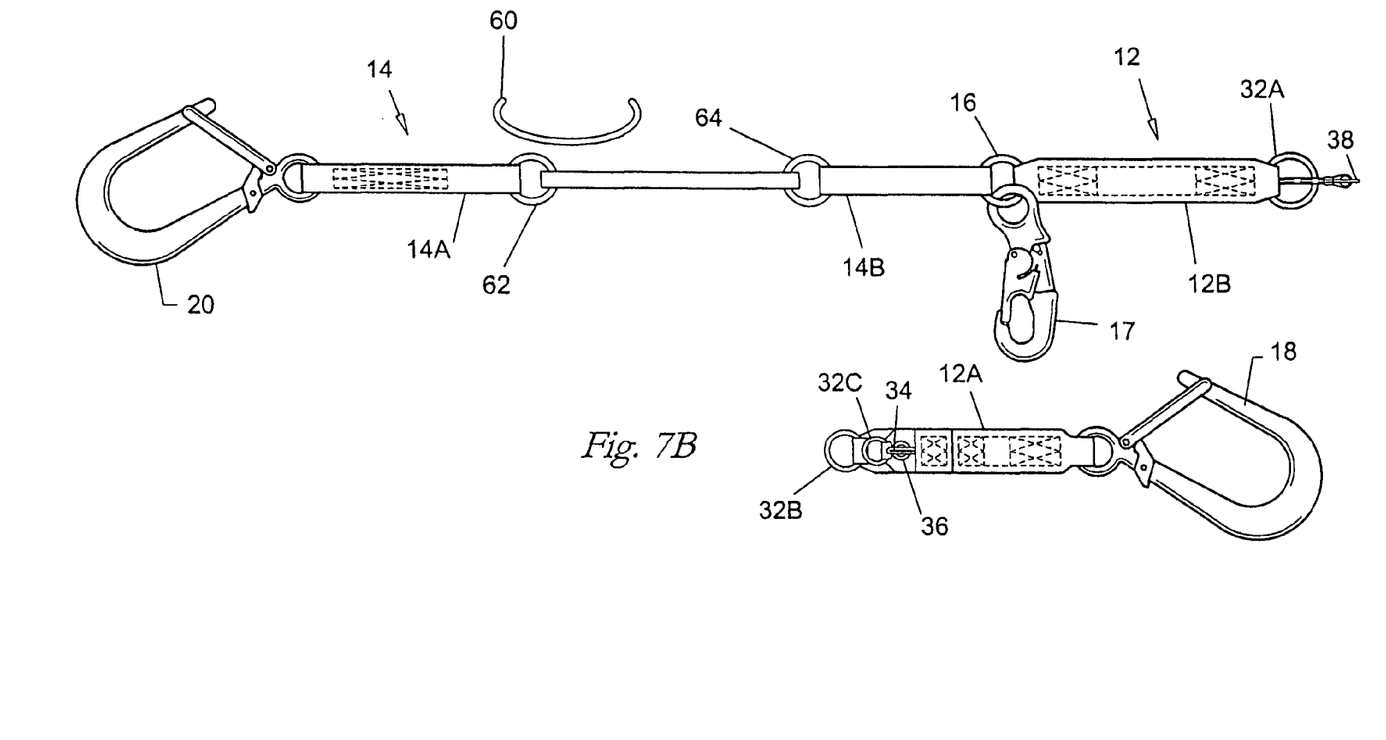
FIG. 7B is view thereof in a disconnected configuration.

In an alternate embodiment depicted in FIGS. 7A and 7B, the limited slip mechanism may comprise a breakaway link 60 in combination with a third lanyard segment 14C joining lanyard segments 14A and 14B. In this embodiment, the breakaway link 60 joins segments 14A and 14B in close proximity by linked connection with additional rings 62 and 64 attached to the respective end portions of lanyard segments 14A and 14B. In addition, lanyard segment 14C has opposing ends connected to ring 62 and 64 respectively. Breakaway link 60 is selected such that application of a predetermined force thereto results in separation of the link and extension of lanyard 14 by the length of segment 14C. Breakaway link 60 may be any suitable link such as a frangible link, breakaway link, hinged link, welded link, riveted link, or suitable equivalent thereof. It should be noted, that any other suitable mechanism that allows for limited extension of lanyard 14 in response to the application of a force of a predetermined threshold value so as to activate quick release 30 is considered within the scope of the present invention.

As previously noted, the second cable end 44 is connected to lanyard segment 14A. Accordingly, when a predetermined opposing force is applied to hooks 18 and 20, the limited slip mechanism 50 (or alternatively 60) activates thereby allowing lanyard 14 to extend. Extension of lanyard 14 causes cable 40 to slide within conduit 42 thereby removing pin 38 from loop 34. Once free, loop 34 no longer functions to maintain the connection between lanyard segments 12A and 12B thereby allowing the separation of lanyard section 12A from the remaining portions of the device 10. It should also be noted that the means for activating release 30, e.g. limited slip mechanism 50 or breakaway link 60, or an alternate means for activating release 30, may in an alternate embodiment, be incorporated on lanyard segment 12, and particularly on segment 12B, rather than on lanyard segment 14.

Figure 12:
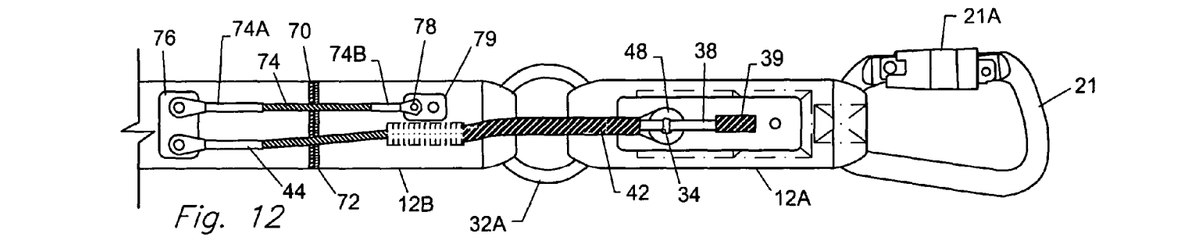
FIG. 12 is a partial bottom view of an alternate embodiment configuration incorporating a frangible link.
Figure 13:
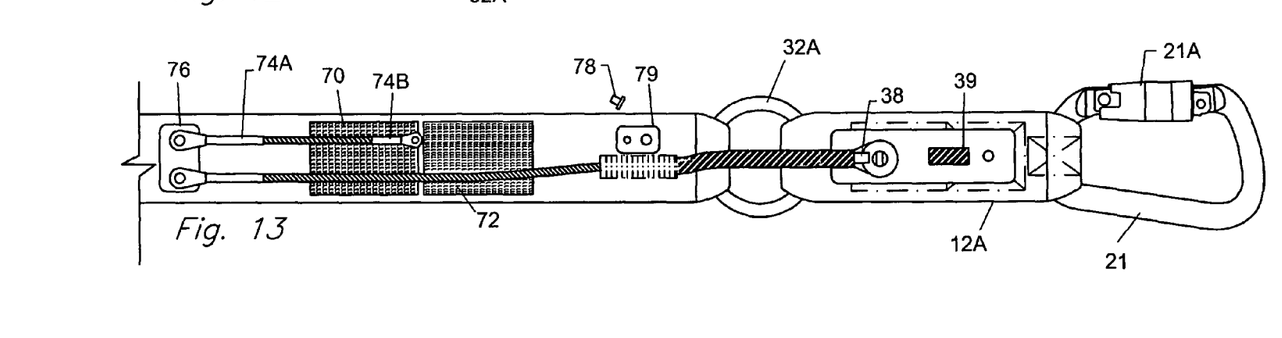
FIG. 13 is a view thereof in a configuration wherein the frangible link has failed.

FIGS. 12 and 13 depict yet another embodiment wherein locking carabiners, referenced as 21, are used in lieu of hooks. A locking carabiner includes an additional mechanism that makes it harder for the gate to open accidentally. Typically the additional mechanism is a sheath or sleeve, referenced as 21A, that covers the gate and the outer C-shaped portion of the carabiner. The sheath either screws into place, or uses a spring to hold it in place. To open the gate, the sleeve must be moved from a first position to a second position wherein the gate may be opened.

In the embodiment depicted in FIGS. 12 and 13, the quick release mechanism 30 again comprises the interlinked ring configuration wherein rings 32A, 32B, and 32C maintained in a load-bearing interlocked configuration by loop 34 secured by pin 38 as disclosed hereinabove. As seen in FIG. 12, a sleeve 39 is attached to lanyard segment 12A to receive the end of pin 38 to prevent unintentional snagging. In this embodiment, however, lanyard segment 12B includes a portion having hook and loop fastening material, comprising a hook patch 70 and a loop patch 72, affixed thereto. The hook and loop fastening material allows for the folded connection of lanyard 12B as depicted in FIG. 12 in a shortened/retracted configuration. Lanyard 12B is maintained in the folded configuration by a cable 74 secured at one end thereof, referenced as 74A, to a portion of lanyard 12B by a load bearing rivet and plate assembly, referenced as 76, and secured at the opposing end thereof, referenced as 74B by a break-away rivet 78 secured by a rigid plate 79 forming a frangible link. In this embodiment, lanyard segment 12B is maintained in the shortened configuration by cable 74. The quick release is automatically triggered when a predetermined threshold force applied to lanyard 12 is reached and break-away rivet 78 fails thereby releasing cable end 74B whereby the tension causes lanyard 12B to lengthen pulling apart hook patch 70 from loop patch 72, as best seen in FIG. 12, resulting in a lengthening of lanyard segment 12B. The lengthening of lanyard segment 12B causes cable 40 to retract pin 38 from loop 34 thereby activating the quick release of rings 32A–32C resulting in the detachable release of lanyard segment 12A as described hereinabove.

Figure 14:
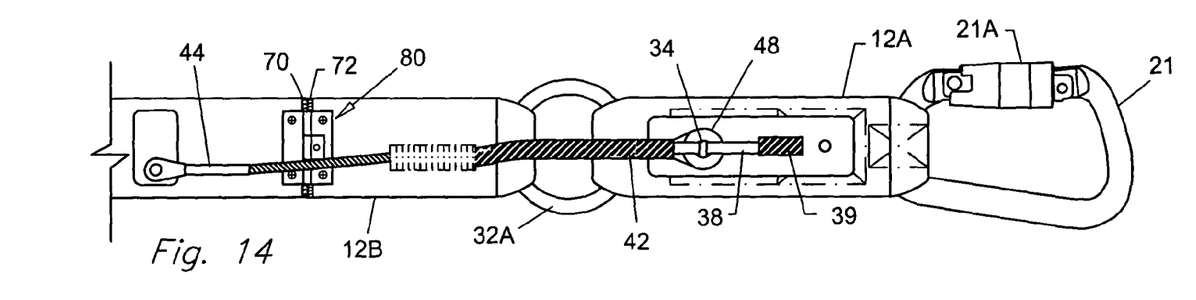
FIG. 14 is a partial bottom view of an alternate embodiment configuration wherein the frangible link is embodied in a hinge.
Figure 15:
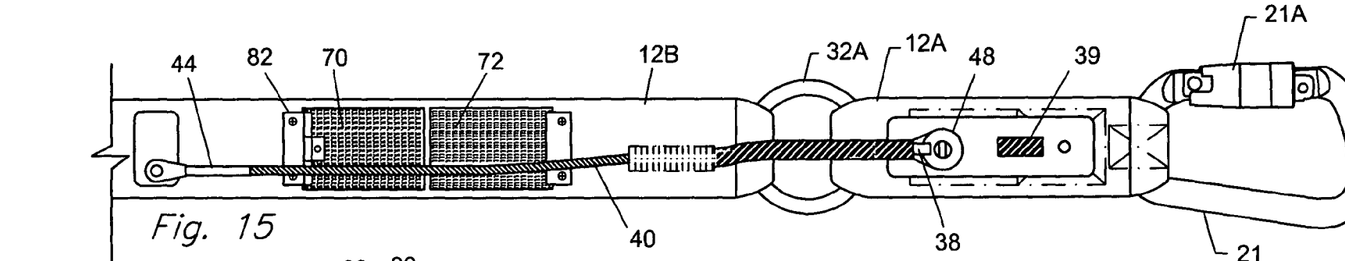
FIG. 15 is a view thereof where the frangible link has failed.
Figure 16:
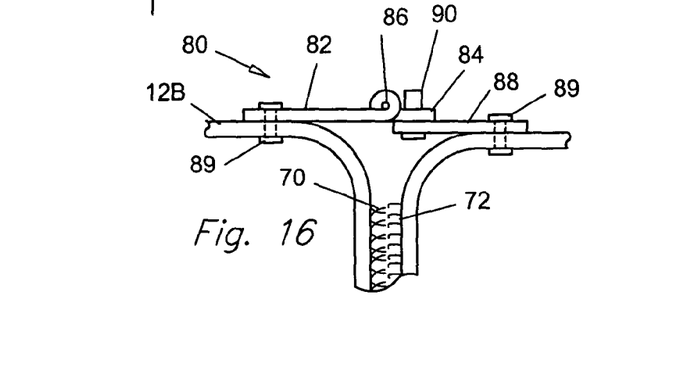
FIG. 16 is a side detail view of the frangible link.
Figure 17:
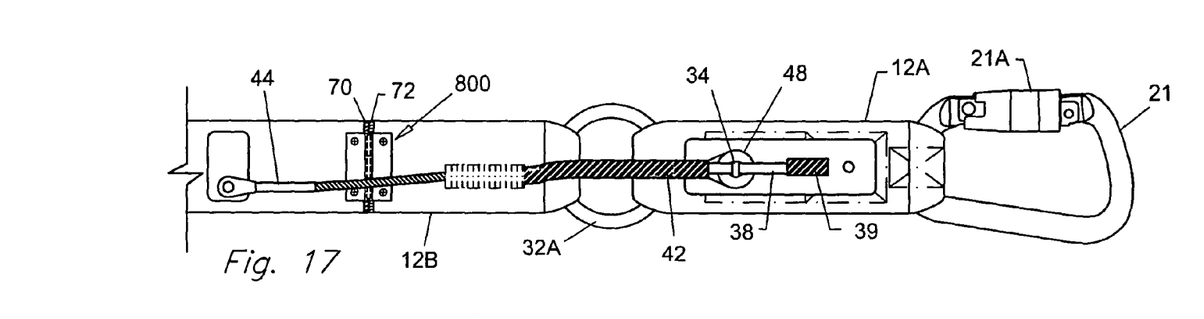
FIG. 17 is a top view of an alternate embodiment frangible link.

In yet another alternate embodiment depicted in FIGS. 14–16, lanyard segment 12B is maintained in the shortened configuration by a hinged plate assembly, generally referenced as 80, which forms the frangible link. Hinged plate assembly 80 includes a first hinge leaf 82 pivotally connected to a second hinge leaf 84 by a pivot pin 86. First hinge leaf 82 is securely connected to lanyard 12 by a strong connection, such as by riveting with one or more rivets 89. Second hinge leaf 84 is connected to a plate 88, which in turn is connected to lanyard segment 12A by a strong riveted connection 89 as best seen in FIG. 16. A rivet 90 connects hinge leaf 84 to plate 88. Rivet 90 is specifically selected to fail when a predetermined threshold force is applied to lanyard 12, and particularly to hinge assembly 80. Upon the failure of rivet 90, hinge leaf 84 is released thereby allowing the lengthening of lanyard segment 12B as depicted in FIG. 15. The lengthening of lanyard segment 12B causes cable 40 to retract pin 38 from loop 34 thereby activating the quick release of rings 32A–32C resulting in the detachable release of lanyard segment 12A as described hereinabove.

Figure 18:
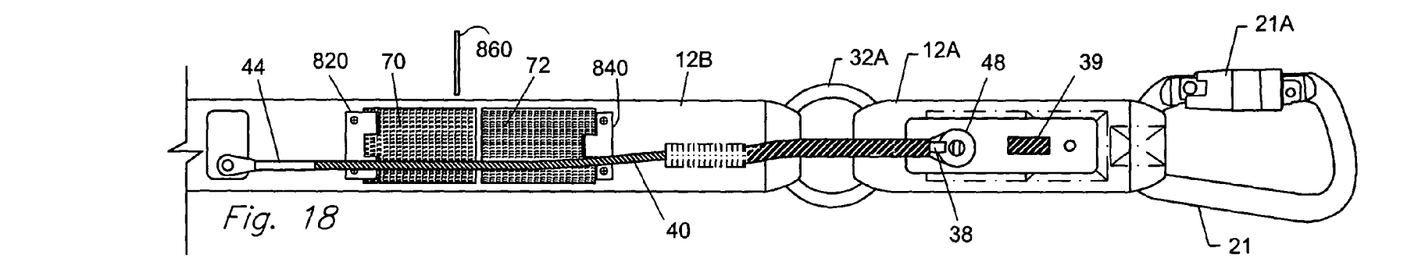
FIG. 18 is a top view thereof where the frangible link has failed.
Figure 19:
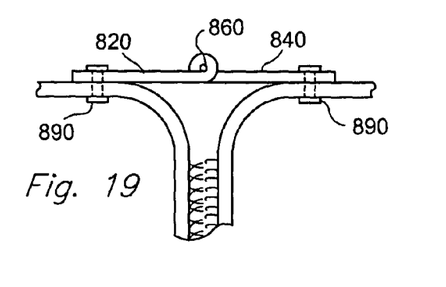
FIG. 19 is side view of the alternate embodiment frangible link prior to failure.
Figure 20:
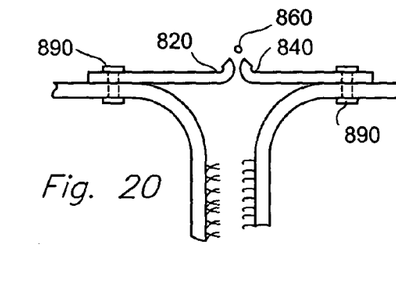
FIG. 20 is a side view of the alternate embodiment frangible link after failure.

In still another alternate embodiment depicted in FIGS. 17–20, lanyard segment 12B is maintained in the shortened configuration by an alternate hinge plate assembly, generally referenced as 800, which forms the frangible link. Hinge plate assembly 800 includes a first hinge leaf 820 pivotally connected to a second hinge leaf 840 by a pivot pin 860. First hinge leaf 820 is securely connected to lanyard 12 by a strong connection, such as by riveting with one or more rivets 890. Second hinge leaf 840 is also connected to lanyard segment 12A by a strong riveted connection 890 as best seen in FIGS. 17–20. Hinge leafs 820 and 840 are fabricated so as to fail, such as by straightening of the hinge leaf structure from around pivot pin 860, upon experiencing a tensional load of a predetermined threshold limit thereby causing the hinge leafs 820 and 840 to separate. Upon the failure of hinge assembly lanyard segment 12B is allowed to lengthen as depicted in FIG. 18. The lengthening of lanyard segment 12B causes cable 40 to retract pin 38 from loop 34 thereby activating the quick release of rings 32A–32C resulting in the detachable release of lanyard segment 12A as described hereinabove.

Figure 8:
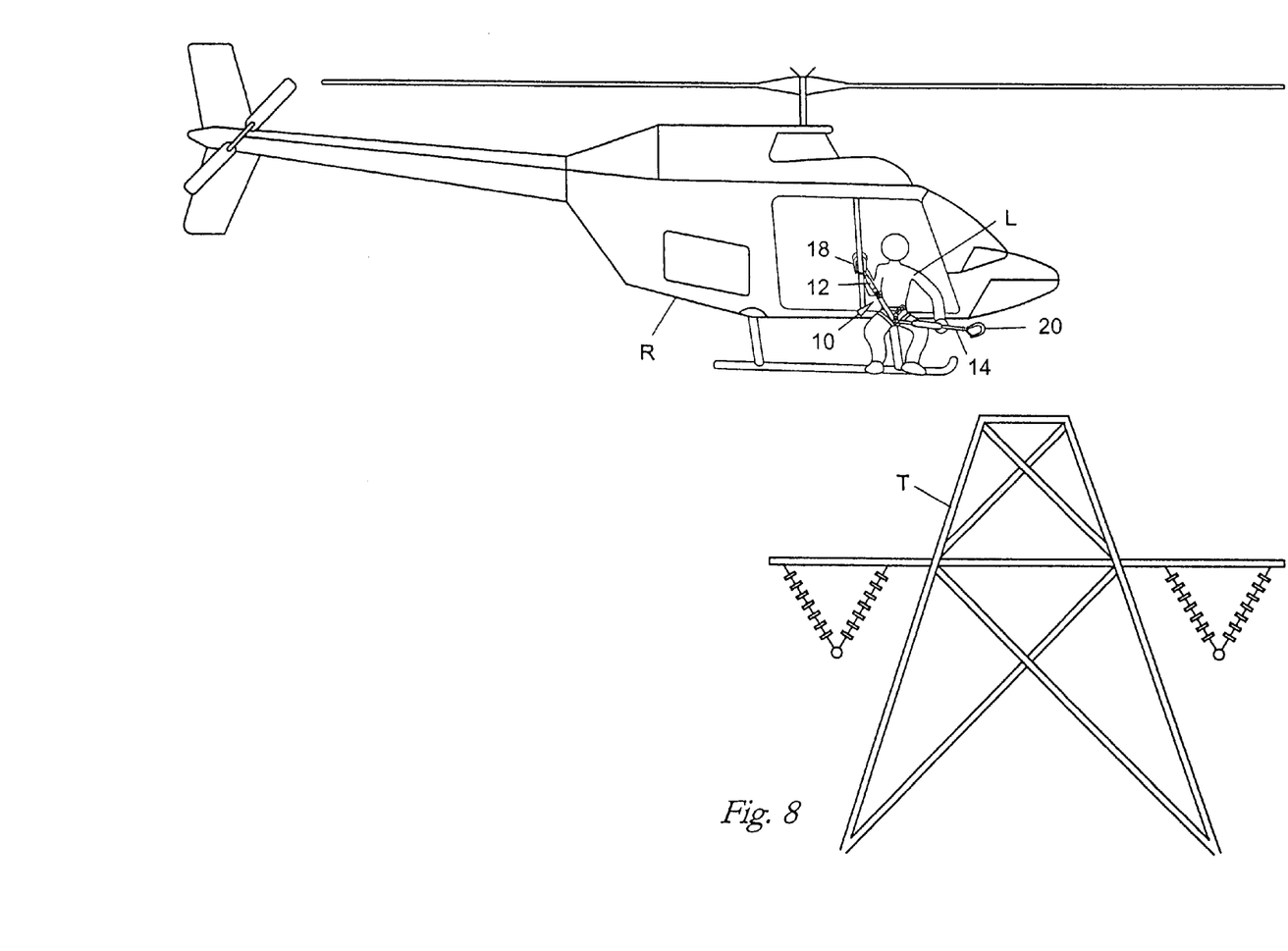
FIG. 8 depicts a human load connected to a rotorcraft prior to transfer.
Figure 9:
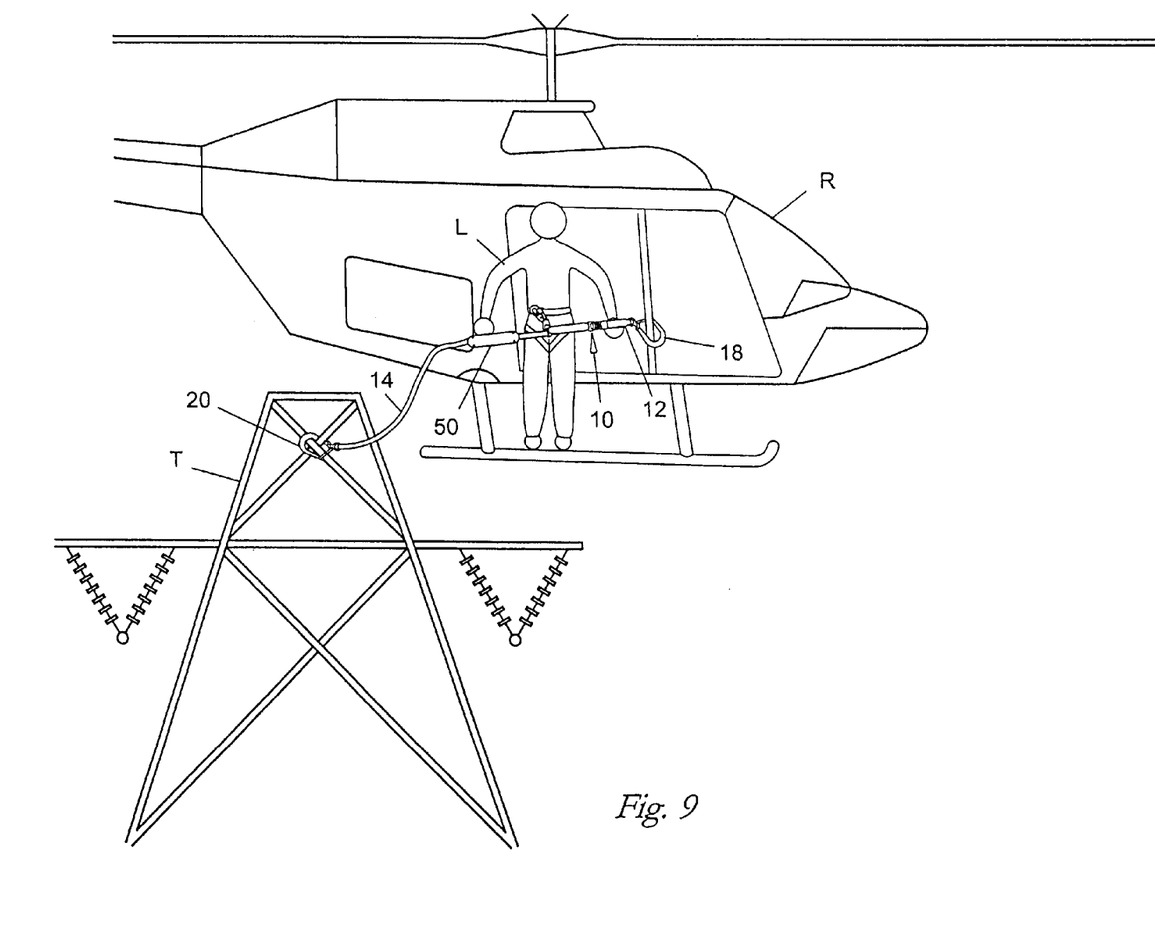
FIG. 9 depicts a human load connected to both the rotorcraft and an adjacent tower structure.
Figure 10:
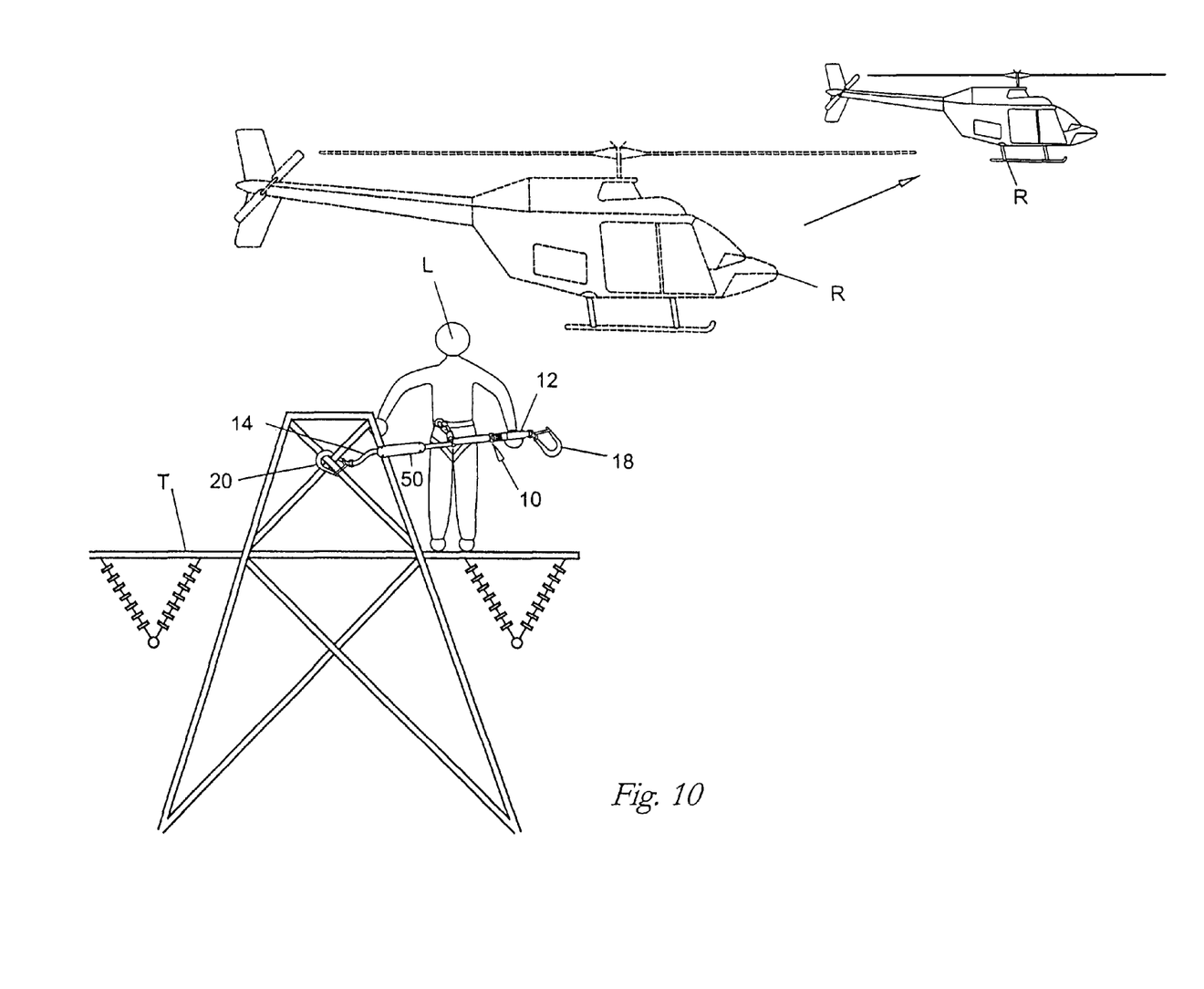
FIG. 10 depicts a human load after transfer to a tower structure.

The emergency release lanyard apparatus disclosed herein may be used in conjunction with the following method to safely transfer a load from a hovering rotorcraft to an adjacent structure. In accordance with the present invention, loads are transferred from an airborne rotorcraft, referenced as "R," to a structure, such as a tower "T," while providing fall protection for the load, referenced as "L," and emergency release capabilities for the aircraft. According to a preferred embodiment, a helicopter is adapted with an external platform configured for carrying a load external to the aircraft fuselage as seen in FIG. 8. The load is preferably prevented from falling from the helicopter by a suitable restraint, such as an FAA approved safety restraint (e.g. seat belt not shown) or one of said lanyards. The load is equipped with a safety harness and lanyard apparatus 10 having first and second lanyards 12 and 14. According to the method, a rotorcraft "R" hovers next to a structure "T," and safe transfer is accomplished by: (1) connecting a safety lanyard apparatus, having first and second lanyards, to the load; (2) securing the load to the rotorcraft with a safety restraint; (3) maneuvering the rotorcraft substantially adjacent to the structure; (4) attaching the free end of the first lanyard 12 to the rotorcraft via hook 18 (FIG. 8); (5) releasing any auxiliary safety restraint (e.g. seat belt); (6) attaching the free end of the second lanyard 14 to the structure via hook 20 (FIG. 9); (7) detaching the first lanyard from the rotorcraft; and (8) transferring the load to the structure (FIG. 10). When transferring from the structure to the helicopter the method is essentially reversed. It should be noted that while the present invention contemplates the use of an auxiliary safety restraint, such as an FAA approved seatbelt, the first and/or second lanyards of the present invention will function as equivalent substitutes to insure that the load is restrained from prior to takeoff through the time when the load is safely deposited onto a structure.

Figure 11:
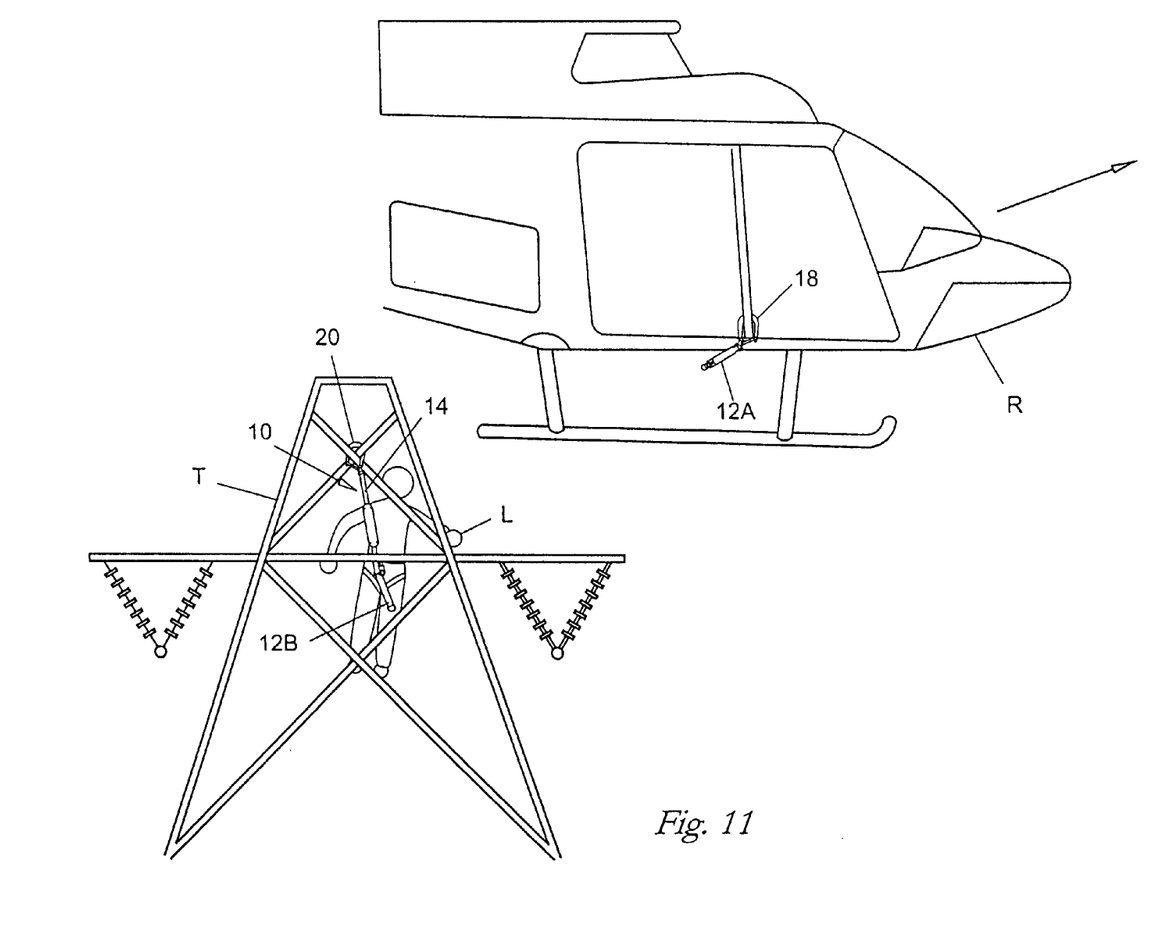
FIG. 11 depicts a human load suspended from a tower structure in an emergency release scenario.

The competing concerns of fall protection (for the load) and on-demand emergency release (for the aircraft) are each enabled by the emergency release lanyard 10. The lanyard apparatus provides total fall protection for the load throughout the transfer process without restricting or otherwise limiting available emergency flight options/maneuvers by incorporating an emergency release that automatically activates on demand. A significant aspect of the method disclosed herein involves maintaining complete fall protection for the load before, during, and after the transfer process without impairing the availability of emergency flight maneuvers for the helicopter as is the case with prior art methods. It should be noted that, according to the method disclosed herein, that the load is protected from accidental falling during all phases of the transfer. Specifically, fall protection is initially provided by an FAA safety restraint (e.g. seat belt or equivalent cargo restraint). During the next step in the process wherein the first lanyard 12 is attached to the aircraft, fall protection is provided by secured attachment of the lanyard segment 12 to a load bearing point on the helicopter; after which the FAA restraint may be removed. During the next step in the process wherein the second lanyard segment 14 is connected to the adjacent structure fall protection is provided by the second lanyard segment. It should be noted, as best depicted in FIG. 9, that during this phase of the transfer, e.g. when the first lanyard segment is attached to the helicopter and the second lanyard segment is attached to the structure, the helicopter is effectively tethered to the structure, and the load is tethered to both the helicopter and the structure. If an actual or perceived emergency dictates that the helicopter pilot execute an emergency pull-away maneuver, the lanyard apparatus is placed in tension. When the predetermined force is reached, the limited slip mechanism (50 or 60) of lanyard segment 14 activates thereby deploying an additional length of lanyard, which change in length activates the quick-release mechanism of lanyard segment 12 thereby releasing hook 18 and allowing the helicopter to depart while lanyard 14 functions to secure the load to the structure as depicted in FIG. 11. In the absence of an emergency, hook 18 is detached from the helicopter and the load is secured to the structure by lanyard 14 as seen in FIG. 10.

The instant invention has been shown and described herein in what is considered to be the most practical and preferred embodiment. It is recognized, however, that departures may be made therefrom within the scope of the invention and that obvious structural and/or functional modifications will occur to a person skilled in the art. It is further recognized that the methods and apparatus disclosed herein are suitable for use with in virtually any elevated and/or fall protection application involving vehicle-to-structure transfer, structure-to-vehicle transfer, and/or vehicle-to-vehicle transfer, or simply to provide fall protection in an elevated environment wherein the user is supported by a first structure while working on a second generally adjacent structure without actually transferring thereto.

What I claim is:

1. A method for providing fall protection for human or non-human loads operating from an aerial lift in an elevated environment in proximity to a structure, said method including the steps of:
    connecting a safety lanyard apparatus to the load, said lanyard apparatus having first and second lanyards, each of said first and second lanyards terminating in a connectable free end;
    said first lanyard segment including a releasable mechanical connection capable of being activated from a normally connected configuration wherein said free end thereof is securely connected thereto, to a disconnected configuration wherein said free end thereof is disconnected therefrom;
    means for activating said releasable mechanical connection thereby activating said mechanical connection from said connected configuration to said disconnected configuration in response to an a predetermined tensional force applied to said first and second lanyard free ends;
    connecting said first lanyard connectable end to the aerial lift;
    connecting said second lanyard connectable end to the structure;
    whereby failure of the aerial lift places tensional force on said first and second lanyards thereby triggering said means for activating said means for releasing said first lanyard connectable end such that said first lanyard connectable end is disconnected, whereby the load is supported from the structure by said second lanyard.

2. A method for providing fall protection for human or non-human loads according to claim 1, wherein said means for activating said releasable mechanical connection is disposed on said second lanyard.

3. A method for providing fall protection for human or non-human loads according to claim 2, wherein said means for activating said releasable mechanical connection includes a frangible mechanical connection frangibly binding two normally spaced lanyard sections in a shortened configuration wherein said two spaced sections are substantially adjacent to each other by said frangible mechanical connection.

4. A method for providing fall protection for human or non-human loads operating from an aerial lift in an elevated environment in proximity to a secondary structure, said method including the steps of:
    connecting a safety lanyard apparatus to the load, said safety lanyard apparatus including first and second lanyards, each of said first and second lanyards having one end connected to the load and an opposing connectable end, said first lanyard incorporating a means for releasing said connectable end thereof, said second lanyard including means, responsive to a tensional threshold force, for activating said means for releasing said first lanyard connectable end;
    connecting said first lanyard connectable end to the aerial lift;
    elevating the load to a position generally adjacent to a secondary structure;
    connecting said second lanyard connectable end to an elevated supporting point on the secondary structure, whereby failure of the aerial lift places a tensional force, greater than or equal to a predetermined force across said first and second lanyards, thereby activating said means for releasing resulting in the separation of said connectable free end of said first lanyard such that the load remains connected to the secondary structure.

5. A method for providing fall protection for human or non-human loads according to claim 4, wherein said means for releasing comprises:
    a releasable mechanical connection connecting said first lanyard connectable end to the remaining portion of said first lanyard;
    said releasable mechanical connection maintained in a connected configuration wherein said first lanyard connectable free end is connected to said first lanyard until the application of a tensional force exceeding a predetermined threshold value applied to said first and second lanyards causes said means for activating to enable the automatic releasable separation of said first lanyard connectable end.

6. A method for providing fall protection for human or non-human loads according to claim 4, wherein said means for activating said releasable mechanical connection includes a frangible mechanical connection frangibly binding two normally spaced lanyard sections in a shortened configuration wherein said two spaced sections are substantially adjacent to each other by said frangible mechanical connection.

7. A method for providing fall protection for human or non-human loads according to claim 6, wherein said means for activating said releasable mechanical connection means in response to a predetermined tensional force comprises a frangible connection that, upon activation allows for limited extension of said first lanyard, whereby the limited extension of said first lanyard triggers said means for means for releasing the connectable end of said first lanyard.

8. A method for providing fall protection for human or non-human loads according to claim 7, wherein said frangible connection comprises a pivotal link.

9. A method for providing fall protection for human or non-human loads according to claim 8, wherein said frangible connection includes a hinge.

10. A method for providing fall protection for human and non-human loads operating from an aerial lift in an elevated environment in proximity to a secondary structure, said method including the steps of:

connecting a safety lanyard apparatus to the load, said safety lanyard apparatus including first and second lanyards, each of said first and second lanyards having one end connected to the load and an opposing connectable free end, said first lanyard incorporating a means for releasing said connectable free end thereof in response to a predetermined tensional force applied across said first and second lanyards, said second lanyard including means, responsive to a predetermined threshold tensional force, for activating said means for releasing;

connecting said first lanyard connectable free end to the aerial lift;

elevating said load using said aerial lift;

connecting said second lanyard connectable free end to the secondary structure;

whereby failure of the aerial lift resulting in decent of the aerial lift places a tensional force, greater than or equal to a predetermined force, across said first and second lanyards thereby triggering said means for activating said means for releasing resulting in the separation of said connectable free end of said first lanyard from said safety lanyard apparatus thereby leaving said load supportedly connected to said secondary structure by said second lanyard.

11. A method for providing fall protection for human and non-human loads operating from an aerial lift in an elevated environment in proximity to a secondary structure, according to claim 10, further including the steps of:

transferring the load to the secondary structure; and disconnecting said first lanyard connectable free end from the aerial lift.

* * * * *